United States Patent

[11] 3,608,513

[72] Inventor  Leonard L. Gray
           10869 Andasal Ave., Granada Hills, Calif.
           91344
[21] Appl. No. 36,247
[22] Filed     May 11, 1970
[45] Patented  Sept. 28, 1971

[54] CURB GUARD FEELER DEVICE
     10 Claims, 8 Drawing Figs.
[52] U.S. Cl. .................................................... 116/28 A,
                                                              340/61
[51] Int. Cl. ................................................... B60q
[50] Field of Search .......................................... 116/28, 28
         A; 73/180, 181, 189; 40/37.1; 200/61.44, 81.9;
                                        244/135, 135 A; 340/61

[56]                References Cited
              UNITED STATES PATENTS
1,593,085   7/1926   Lang ........................... 40/37.1

2,663,523  12/1953  Leisy ............................  244/135
2,728,032  12/1955  Foltz ............................  116/28 X
2,919,577   1/1960  Cone ............................  73/181
3,475,958  11/1969  Sabadishin et al. ............  73/180

Primary Examiner—Louis J. Capozi
Attorney—Polachek & Saulsbury

ABSTRACT: A curb guard feeler device for a vehicle having an elongated flexible feeler rod extending laterally from the vehicle. The feeler rod is provided with an airfoil member for aerodynamically elevating the rod from the rod surface when the vehicle is moving. A counterweight is provided to facilitate the elevating of the feeler rod from the road surface at low vehicle speeds. The feeler device is secured to a fender of the vehicle by means of a double action clamp which will position the feeler device at a suitable height with respect to the road surface and additionally will permit universal adjustment of the elongated rod and attached air foil member.

PATENTED SEP 28 1971 3,608,513
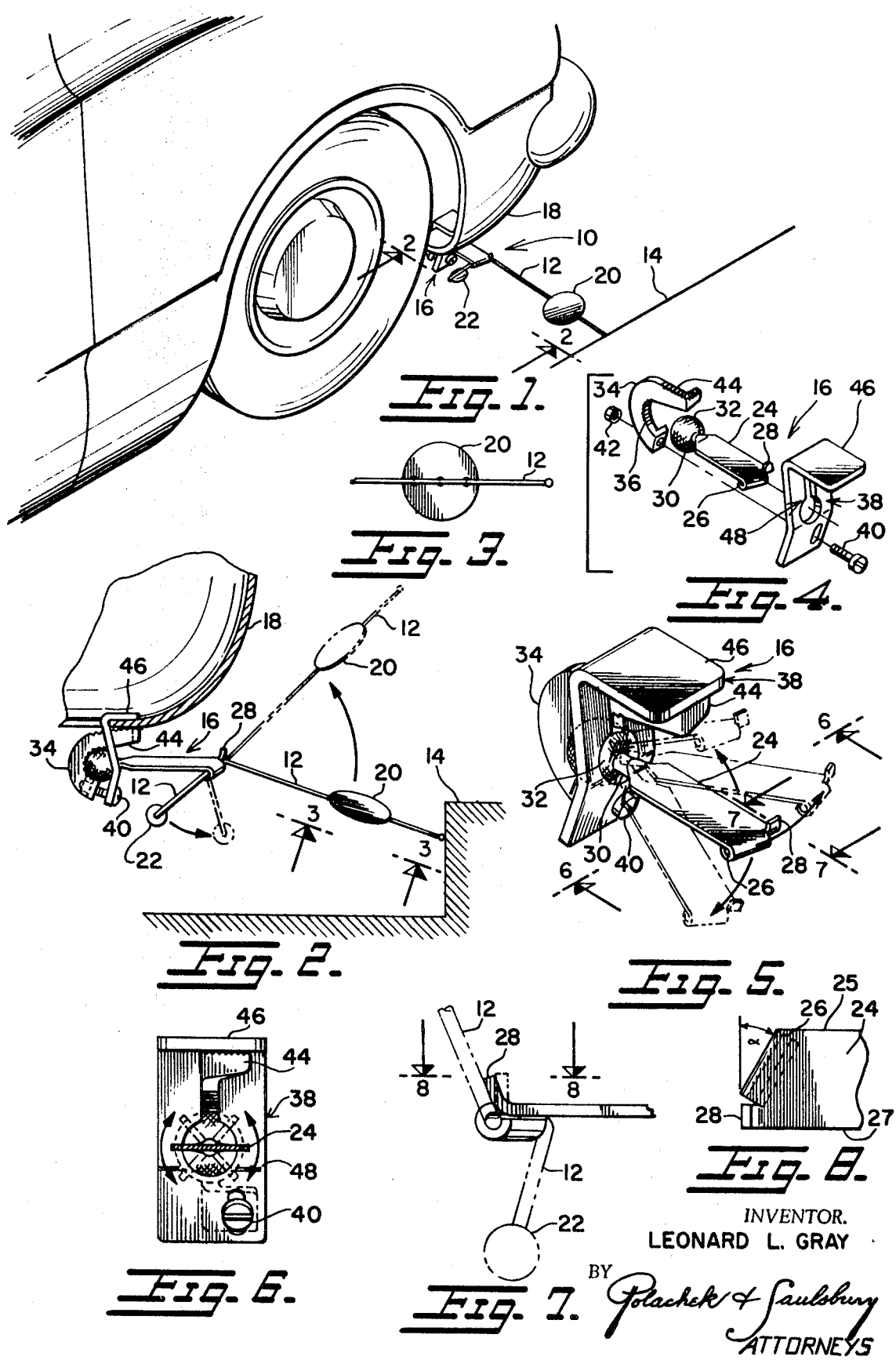
INVENTOR.
LEONARD L. GRAY
BY Polachek & Saulsbury
ATTORNEYS

CURB GUARD FEELER DEVICE

The curb guard feeler device of this invention is generally related to and considered an improvement upon the "Flying Curb Guard Signal Device" disclosed in the copending application Ser. No. 855,932, filed Sept. 8, 1969.

This invention relates more particularly to a feeler device attached to the fender or other portion of a vehicle and used to indicate or otherwise signal the location of the vehicle with respect to a curb or other obstruction.

The conventional curb feeler devices are usually designed to laterally project from the vehicle a predetermined and limited distance to insure that the end of the feeler rod will not contact the road surface. This limitation on the projected length of the feeler devices have consequently resulted in their inability to satisfactorily indicate the presence of a curb or other surface which is lower than normal, or slightly beyond the reach of the feeler. Attempts to provide longer feeler devices have proved unsuccessful because the longer feeler lengths caused excessive vibration when the vehicle was in motion and also increased the tendency to snag obstructions on the road surface and to be severed from the vehicle.

This invention utilizes a means for elevating a curb guard feeler device from the road surface when the vehicle is in motion, to thus obviate the disadvantages previously mentioned. The feeler device of this invention is also provided with a double action clamp for attaching same to a vehicle and for effectively and accurately positioning the feeler device with respect to the road surface.

The curb guard feeler device includes an elongated flexible feeler rod having an air foil member attached thereto. The airfoil member can be oriented so as to aerodynamically elevate the elongated rod in response to the airstream caused by the relative motion or speed of the vehicle. Additionally, a counterweight is provided for elevating the elongated feeler rod at low vehicle speeds. A double action clamp secures the rod to the vehicle. This clamp will position the elongated rod at a suitable height above the road surface. Additionally, the clamp will permit for universal positioning of the elongated feeler rod and airfoil member thus controlling the amount of aerodynamic lift.

It is therefore an object of the present invention to provide a curb guard feeler device which will be elevated above the road surface during relative movement of the vehicle.

It is another object of this invention to provide a double action clamp for adjustably securing the feeler device to the vehicle.

It is a further object of this invention to provide means for controlling the aerodynamic lift of the feeler rod.

The above and other objects, features and advantages of the present invention will be apparent from the following description of the preferred embodiments considered in connection with the accompanying drawings.

In the accompanying drawings in which is shown some of the various possible embodiments of the invention:

FIG. 1 is a perspective view of the curb guard feeler device shown mounted on the fender of an automobile.

FIG. 2 is an enlarged longitudinal sectional view taken along line 2—2 of FIG. 1.

FIG. 3 is a fragmentary auxiliary view taken along line 3—3 of FIG. 2 and showing in detail the airfoil member.

FIG. 4 is an enlarged perspective shown in exploded view of the double action clamp.

FIG. 5 is an enlarged perspective view of the double action clamp showing in dashed lines, some of the various positions which the apparatus may assume.

FIG. 6 is an auxiliary view of the double action clamp taken along line 6—6 of FIG. 5.

FIG. 7 is a fragmentary enlarged cross-sectional view taken along line 7—7 of FIG. 5 showing the projection for limiting the elevated position of the feeler rod.

FIG. 8 is a fragmentary view of the portion of the base plate taken along line 8—8 of FIG. 7. Referring now in detail to the drawings, the reference numeral 10 indicates generally the curb guard feeler device of this invention shown attached to the fender 18 of an automobile. The device 10 includes an elongated flexible feeler rod 12 for indicating or signalling contact with a curb surface 14. A double action clamp 16 secures the rod 12 to a portion of a vehicle such as fender 18. An airfoil member 20 is affixed to the rod 12 at one end thereof and serves as a means for aerodynamically lifting the rod off the road surface during movement of the vehicle. A counterweight 22 affixed to the rod 12 at the other end thereof helps to elevate the rod 12 from the road surface at low relative speeds and additionally provides added stability when the rod 12 is in the raised elevated position. Typically the elongated flexible feeler rod 12 extends approximately 15 inches from the fender of the automobile and may be made of spring steel or other suitable and durable material. The airfoil member 20 is approximately 3 inches in diameter and is preferably made of thin metal, plastic or other lightweight material and may be affixed to the elongated flexible rod 12 by means of spot welding same thereto or by using an appropriate adhesive. It has been found that by using the above described arrangement, the airfoil member 20 will elevate the rod 12 at relative vehicle speeds of approximately 15 to 20 miles per hour. It should of course be obvious that the aerodynamic lifting of the rod 12 will depend in part on the angular positioning of the airfoil member 20 about the longitudinal axis of feeler rod 12 which can be considered as the angle of attack of the airfoil member 20 with respect to the intercepted airstream. A larger angle of attack will provide for the aerodynamic lifting of the feeler rod 12 at a lower vehicle speed and conversely a decreased angle of attack would appropriately require higher relative vehicle speeds in order to aerodynamically lift the feeler rod 12. The double action clamp 16 is particularly suited for positioning the feeler rod 12 and will now be further described in more detail.

The clamp 16 includes a base plate 24 having one end thereof doubled over to form an eye 26 through which the feeler rod 12 may be pivotally secured to the base plate 24. The eye 26 effectively forms a hinge for supporting the continuous feeler rod 12 which has counterweight 22 at one end and an airfoil member 20 at the other end. The tab projection 28 adjacent the eye 26 operated as a stop to limit the maximum upward movement of the feeler rod 12 shown by the broken lines in FIG. 2 and FIG. 7, thus preventing the feeler rod 12 from contacting or scratching the vehicle surface. The distal end of base plate 25 has a necked-down portion 30 and an attached spherical head 32. An arcuate jaw member 34 has a socket portion 36 adapted to receive the spherical head 32. The surface of the spherical head 32 and socket portion 36 may be appropriately roughened or milled to facilitate gripping and to improve the positioning of the respective elements. An L-shaped bracket 38 having aperture 48 is adapted to be interlockingly engaged to the jaw member 34 by means of bolt 40 and nut 42 and when firmly attached will secure the spherical head 32 within the socket portion 36 of jaw member 34, and a portion of the jaw member 34 will project through aperture 48. The clamp 16 will provide for universal movement of the spherical head 32, base plate 24 and the attached feeler rod 12, prior to the tightening of the bolt 40 and the nut 42. Thus by rotating the baseplate 24 and attached feeler rod 12, as indicated by the arrows in FIG. 6, the airfoil member 20 and its respective angle of attack may be accordingly adjusted. Additionally, the base plate 24 may be moved in a horizontal and vertical plane as indicated by the dashed lines in FIG. 5 so that the lateral displacement of the end of the feeler rod 12 from the vehicle and its height above the road surface, can be independently determined.

The feeler rod 12 is secured to the fender 18 of the vehicle when bolt 40 is tightened, by means of the clamping action, between tail portion 44 of the jaw member 34 and a confronting leg extension 46 of the bracket 38. The tail portion 44 is suitably provided with a roughened or milled surface to facilitate gripping the fender 18. The end of the baseplate 24 defining the eye 26 is preferably angled as shown in FIG. 8, the angle formed between the end of the baseplate 24 and a line normal to and projecting between two opposed surfaces 25 and 27 of the baseplate 24, may typically be 30°. The reason for so angling the end of the base plate 24 is so that feeler rod 12 and airfoil member 20 will project rearwardly from the direction of vehicle travel and therefore as the airfoil member 20 rises in the airstream, the angle of attack or angle in which the airstream is intercepted by the airfoil member 20 will be reduced progressively thus placing the airfoil member 20 in a streamlined position when it reaches its uppermost raised or elevated position.

In actual operation it is desired to place at least four (two front and two rear) curb guard feeler devices 10 on a vehicle and to lift both the front and rear feeler devices 10 at the same time. It is therefore preferable to adjust the airfoil member 20 of the rear curb guard feeler device 10 for a greater angle of attack to compensate for the fact that there will be more turbulence in the airflow in the rear portion if the vehicle and consequently less effective aerodynamic lifting of same. The counterweight 22 is used to facilitate the lifting of the airflow member 20 particularly for the curb guard feeler devices 10 attached to the rear fenders of the vehicle. The counterweight 22 will also prevent the feeler rod 12 from floating or moving upwardly and downwardly in the turbulent air currents and will hold the rods 12 in a fixed upward position.

It is noted that the cited embodiment is intended as exemplary and has described the invention with a specific implementation thereof, other modifications and variations might be made in this embodiment as so set forth and would be apparent to those skilled in the art.

It should be understood that all matter herein described or shown in the accompanying drawings is to be interpreted as illustrative and not in a limiting sense.

What is claimed is:

1. A curb guard feeler device adapted to extend laterally outwardly from a vehicle and to move to an upward elevated position when the vehicle is moving, comprising an elongated feeler rod, double action clamp means for adjustably securing the rod to a vehicle, an airfoil member attached to one end of the rod for elevating the rod and a counterweight attached to the other end of the rod to facilitate the elevating of the rod.

2. A curb guard feeler device as claimed in claim 1, wherein the double action clamp means comprises a baseplate member with means at one end thereof for pivotally securing the feeler rod, a head fixed to the distal end of the baseplate member, an arcuate jaw member having a socket portion for accommodating said head, and a bracket member for interlocking engagement with the jaw member to adjustably secure the head between the jaw member and the bracket.

3. A curb guard feeler device as claimed in claim 2, wherein the double action clamp means further includes means for simultaneously securing the feeler rod to the fender of a vehicle.

4. A curb guard feeler device as claimed in claim 3, further comprising the hinge means formed at one end of the base member, said hinge means pivotally securing the feeler rod to the baseplate.

5. A curb guard feeler device as claimed in claim 4, wherein the baseplate contains an upwardly projecting tab portion, said tab portion serving as a means for limiting the upward elevated position of the feeler rod.

6. A curb guard feeler device as claimed in claim 5, wherein the hinge means formed at the end of the baseplate is at an angle to a line normal to and projecting between two opposed side surfaces of the baseplate.

7. A curb guard feeler device as claimed in claim 6, wherein the head affixed to the baseplate is spherical and may be universally positioned within the socket thus permitting the base plate and attached feeler rod to be rotated about a longitudinal axis to vary the position of the airfoil member with respect to an intercepted airstream.

8. A curb guard feeler device as claimed in claim 7, wherein the arcuate jaw member has a tail portion and the bracket member has a leg extension confronting said tail portion, the cooperative clamping action between the tail portion and leg extension serving to grasp the fender of a vehicle therebetween.

9. A curb guard feeler device as claimed in claim 8, wherein the arcuate jaw member has a socket portion having a roughened surface and the spherical head attached to the baseplate similarly has a roughened surface to improve the frictional contact between the two members.

10. A curb guard feeler device as claimed in claim 9, wherein the bracket member defines an aperture therein for accommodating the tail portion of the arcuate jaw member and further including bolt means for maintaining the jaw and bracket members in interlocking engagement.